United States Patent
Crawford et al.

(10) Patent No.: US 10,011,210 B2
(45) Date of Patent: Jul. 3, 2018

(54) UTILITY VEHICLE RACK

(71) Applicant: ASW, LLC, Fort Wayne, IN (US)

(72) Inventors: Kegan M. Crawford, Fort Wayne, IN (US); John D. Smith, Van Buren, IN (US)

(73) Assignee: ASW, LLC, Fort Wayne, IN (US)

(*) Notice: Subject to any disclaimer, the term of this patent is extended or adjusted under 35 U.S.C. 154(b) by 0 days.

(21) Appl. No.: 15/680,935

(22) Filed: Aug. 18, 2017

(65) Prior Publication Data
US 2017/0341557 A1    Nov. 30, 2017

Related U.S. Application Data

(62) Division of application No. 14/966,550, filed on Dec. 11, 2015.

(60) Provisional application No. 62/091,186, filed on Dec. 12, 2014.

(51) Int. Cl.
*B60P 1/04* (2006.01)
*B60P 1/28* (2006.01)

(52) U.S. Cl.
CPC .................... *B60P 1/283* (2013.01)

(58) Field of Classification Search
CPC .... B60P 1/283; B60P 1/28; B60P 1/04; B60P 1/16; B60N 2/3013
USPC .............. 298/17 R, 22 R, 22 P; 296/3, 183.2
See application file for complete search history.

(56) References Cited

U.S. PATENT DOCUMENTS

| | | | |
|---|---|---|---|
| 9,352,496 B2 | 5/2016 | Takahashi et al. | |
| 2010/0060026 A1* | 3/2010 | Bowers | B60N 2/3013 298/22 R |
| 2011/0187178 A1 | 8/2011 | King | |
| 2016/0185406 A1 | 6/2016 | Tsumiyama et al. | |

* cited by examiner

*Primary Examiner* — Stephen T Gordon
(74) *Attorney, Agent, or Firm* — Taylor IP, P.C.

(57) ABSTRACT

A utility vehicle includes a frame; a dump bed carried by the frame and having a non-dumping position and a dumping position; a dumping mechanism connected to the dump bed and configured to move the dump bed between the non-dumping position and the dumping position; a roof carried by the frame above the dump bed; and a rack carried by the frame below the roof, the rack being configured to not interfere with the dump bed in the dumping position.

11 Claims, 8 Drawing Sheets

UTILITY VEHICLE RACK

CROSS REFERENCE TO RELATED APPLICATIONS

This is a division of U.S. patent application Ser. No. 14/966,550, entitled "UTILITY VEHICLE RACK", filed Dec. 11, 2015, which is incorporated herein by reference. U.S. patent application Ser. No. 14/966,550 is a non-provisional application based upon U.S. provisional patent application Ser. No. 62/091,186, entitled "UTILITY VEHICLE RACK", filed Dec. 12, 2014, which is incorporated herein by reference.

BACKGROUND OF THE INVENTION

1. Field of the Invention

The present invention relates to utility vehicles, and, more particularly, to utility vehicle racks.

2. Description of the Related Art

Utility terrain vehicles (UTVs) are commonly used to travel and carry small cargo loads across varied terrains. Typically, UTVs are smaller, more open, and travel at lower speeds than road-traversing automobiles. UTVs are also typically designed to be outfitted with varying accessories to allow the UTVs to be used to fulfill a variety of specialized tasks.

One type of accessory that a UTV can be equipped with is a dump bed and associated dumping mechanism. The dump bed and dumping mechanism allow for material, such as gravel or mulch, to be loaded into and carried by the UTV to a dump site, where the dumping mechanism can be employed to tip the dump bed and dump the material from the dump bed. To maintain a more even weight distribution and allow the UTV operator to see clearly, the dump bed and associated dumping mechanism are usually placed at the rear end of the UTV, opposite the front end where the engine of the UTV resides. This configuration limits the UTV's storage space when the dump bed and dumping mechanism are being utilized, since anything placed in the dump bed will be dumped to the ground when the dumping mechanism is employed.

What is needed in the art is a utility vehicle with increased storage space compared to known utility vehicles.

SUMMARY OF THE INVENTION

The present invention provides a utility vehicle with a rack carried above a dump bed of the utility vehicle such that the rack does not interfere with the dump bed while material is being dumped from the dump bed.

The invention in one form is directed to a utility vehicle including a frame; a dump bed carried by the frame and having a non-dumping position and a dumping position; a dumping mechanism connected to the dump bed and configured to move the dump bed between the non-dumping position and the dumping position; a roof carried by the frame above the dump bed; and a rack carried by the frame below the roof, the rack being configured to not interfere with the dump bed in the dumping position.

The invention in another form is directed to a utility vehicle including a frame; a dump bed carried by the frame and having a non-dumping position and a dumping position, the dump bed having a maximum height in the dumping position; a dumping mechanism connected to the dump bed and configured to move the dump bed between the non-dumping position and the dumping position; and a rack carried by the frame and having a bottom with a rack bottom height which is less than the maximum height of the dump bed, at least a portion of the rack being above the dump bed in the non-dumping position, the rack being configured to not interfere with the dump bed in the dumping position.

An advantage of the present invention is the rack provides additional storage space for the utility vehicle without interfering with the dumping action of the dump bed.

Another advantage is the rack can hang over the dump bed and take advantage of normally unused space.

Yet another advantage is the rack can hold items, such as shelves or boxes, on an interior or exterior of the rack.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
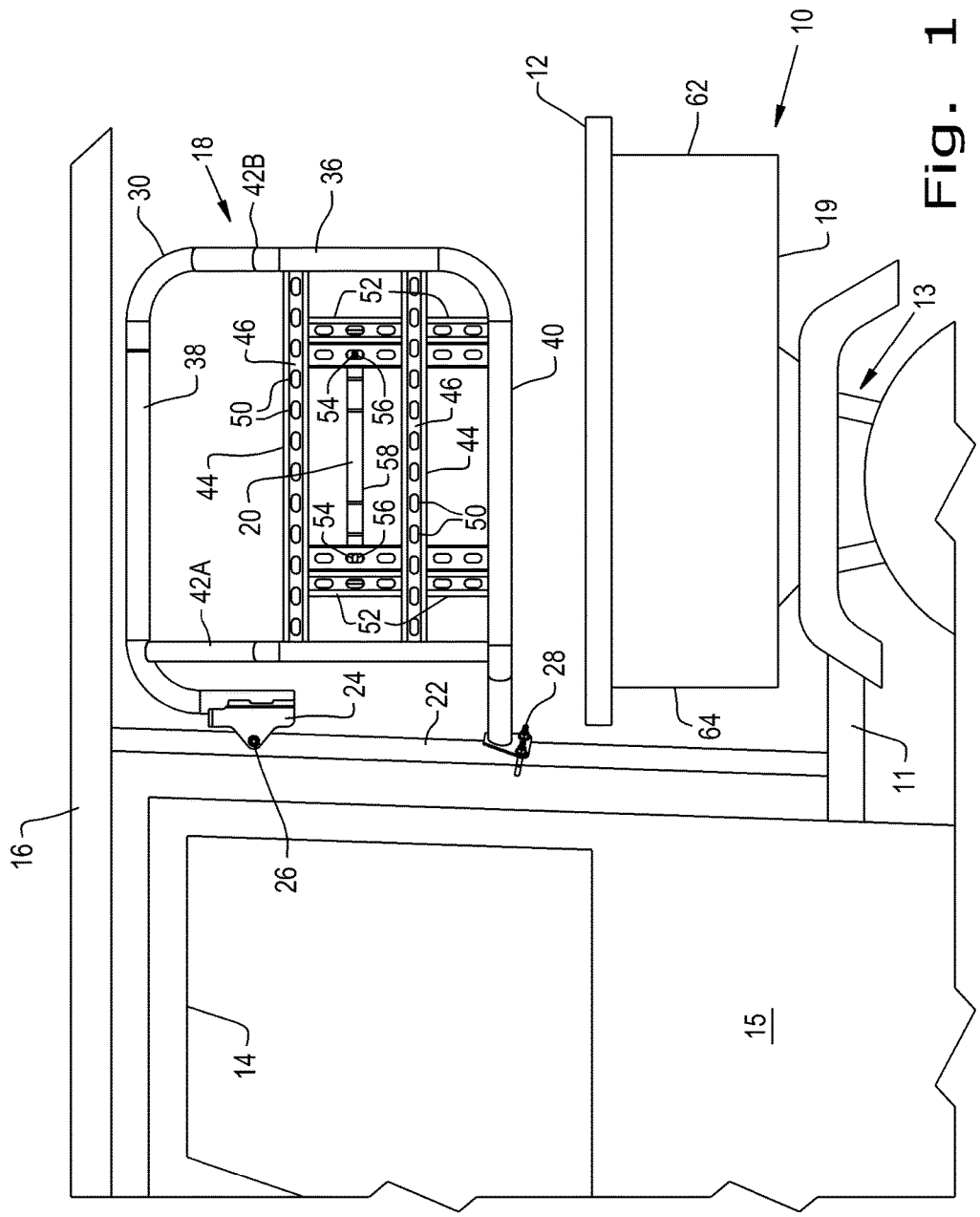
FIG. 1 is a side view of an embodiment of a utility vehicle according to the present invention with a dump bed in a non-dumping position.
Figure 2:
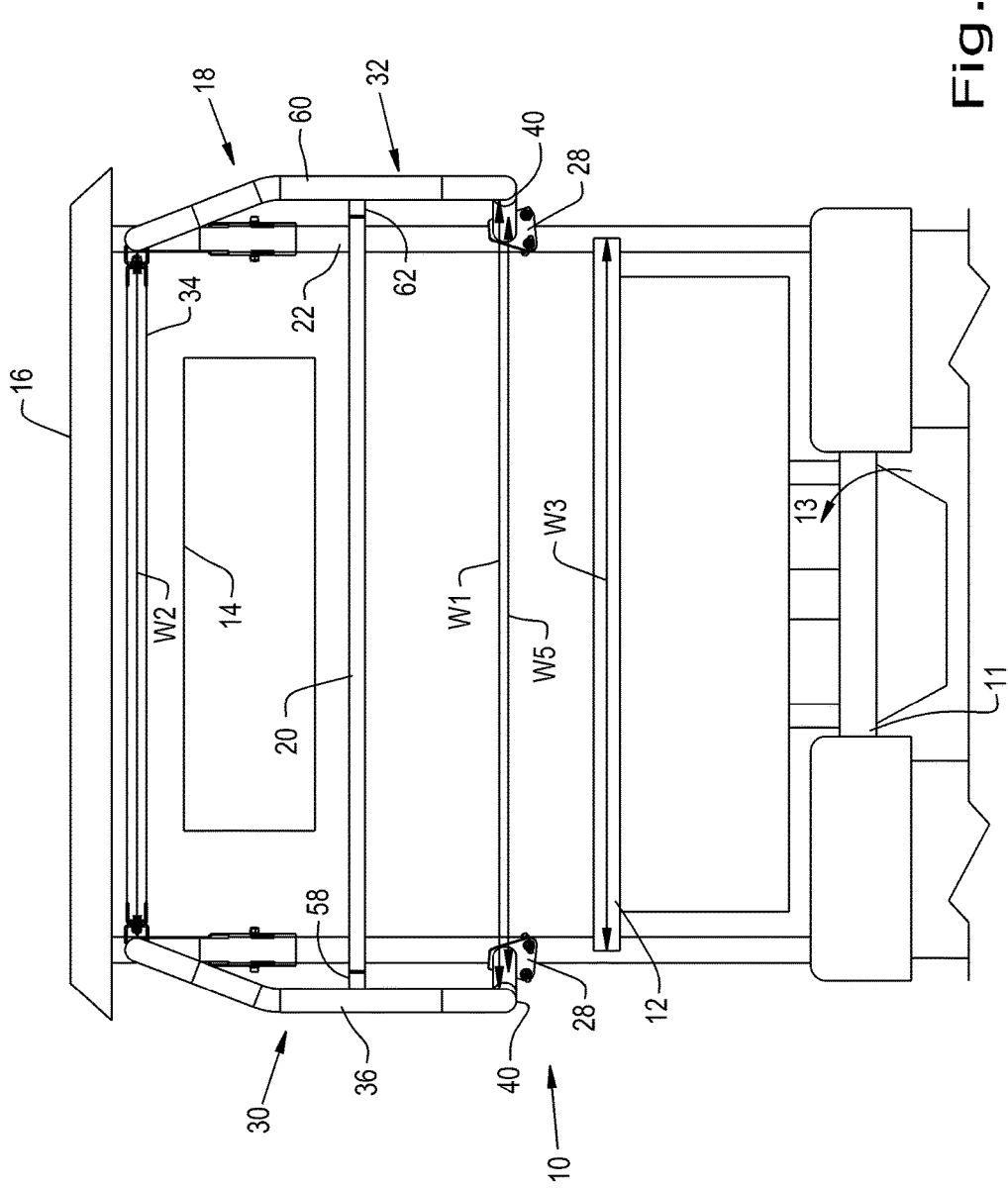
FIG. 2 is a rear view of the utility vehicle shown in FIG. 1 with the dump bed in the non-dumping position shown in FIG. 1.

Referring now to the drawings, and more particularly to FIGS. 1-2, there is shown a utility terrain vehicle (UTV) 10 which generally includes a frame 11, a dump bed 12 carried by the frame 11 with an associated dumping mechanism 13 connected to the dump bed 12, a cab 14 carried by the frame 11, a roof 16 carried by the frame 11 above the dump bed 12, and a rack 18 carried by the frame 11 between the roof 16 and the dump bed 12. As can be seen, the frame 11, which can also be referred to as a chassis of the UTV 10, provides a support structure for the components of the UTV 10. As such, the frame 11 can have a large variety of constructions, depending upon the design parameters of the UTV 10. The cab 14 is shown as being partially enclosed by door 15, but can be fully enclosed or open if desired. Control mechanisms, such as the steering wheel, for the UTV 10 can be placed inside the cab 14 to allow for an operator to control the UTV 10 from the cab 14 while the UTV 10 is being used. Many types of cab constructions are known, and any suitable cab construction may be included in the UTV 10 according the present invention.

The dump bed 12, as shown, is a flatbed carried by the frame 11 near a rear of the UTV 10. The dump bed 12 can have any shape and size suitable to hold material placed in the dump bed 12 and dump the held material after being tilted by the dumping mechanism 13. As can be seen, the dumping mechanism 13 is attached to the dump bed 12 and the frame 11 and allows the dump bed 12 to tilt. The dumping mechanism 13 can be, for example, hinged to the frame 11 so that the dumping mechanism 13 allows the dump bed 12 to tilt when pushed or pulled in the forward and rearward directions, causing material held in the dump bed 12 to be dumped. The dumping mechanism 13 can be activated manually by a user or mechanically by an actuator, such as a cylinder, that is carried by the frame 11. Further, the dumping mechanism 13 can be selectively locked into the non-dumping position to prevent inadvertent dumping of material from the dump bed 12. As shown in FIGS. 1-2, the dump bed 12 is in a non-dumping position where material held in the dump bed 12 will tend to stay in the dump bed 12 when the UTV 10 is on a flat surface, assuming the material is not overflowing. While the non-dumping position of the dump bed 12 is shown with a bottom 19 of the dump bed 12 defining a parallel plane to the flat surface that the UTV 10 is traversing, this is not necessary.

A roof 16 is also carried by the frame 11 above the cab 14 and dump bed 12 to cover the cab 14 and dump bed 12. The roof 16 can be connected to the frame 11 by one or more supports, such as vertical supports 22. As shown, the roof 16 can partially or fully cover the cab 14 and dump bed 12 to protect the operator and/or material in the dump bed 12 from sunlight, precipitation, and/or falling objects. The shape and size of the roof 16 can be adjusted to give desired aesthetic and performance characteristics to the UTV 10, as is known in the art. It should be appreciated that the roof 16 can also be removed from the UTV 10 if covering the cab 14 and/or dump bed 12 is not desired.

A rack 18 is carried by the frame 11 below the roof 16 by connection to vertical supports 22. As shown, the vertical supports 22 are a part of the frame 11 and are connected to both the roof 16 and the rack 18 to support the roof 16 in the vertical direction and provide the rack 18 with vertical static members to which the rack 18 can be cantilevered. While the rack 18 is shown as being connected to vertical supports 22 that are also connected to the roof 16, this is optional and the roof 16 can be connected to different vertical supports that do not connect to the rack 18. The rack 18 can connect to the vertical supports 22 using mounting brackets 24 with mounting pins 26 that extend through openings (not seen) formed in the vertical supports 22. The rack 18 can also have secondary mounting brackets 28 connecting the rack 18 to the vertical supports 22. Alternatively, the rack 18 can be cantilevered to the roof 16 or connected to a horizontally extending portion of the frame 11. As can be seen in FIG. 2, the rack 18 can include a first rack side member 30 connected to a second rack side member 32 by a shelf 20 and a crossbar 34. As shown, the rack side members 30 and 32 are mirror images of one another. For ease of description, only the first rack side member 30 is further described herein, but it should be appreciated that the second rack side member 32 can be configured in a similar way.

Figure 7:
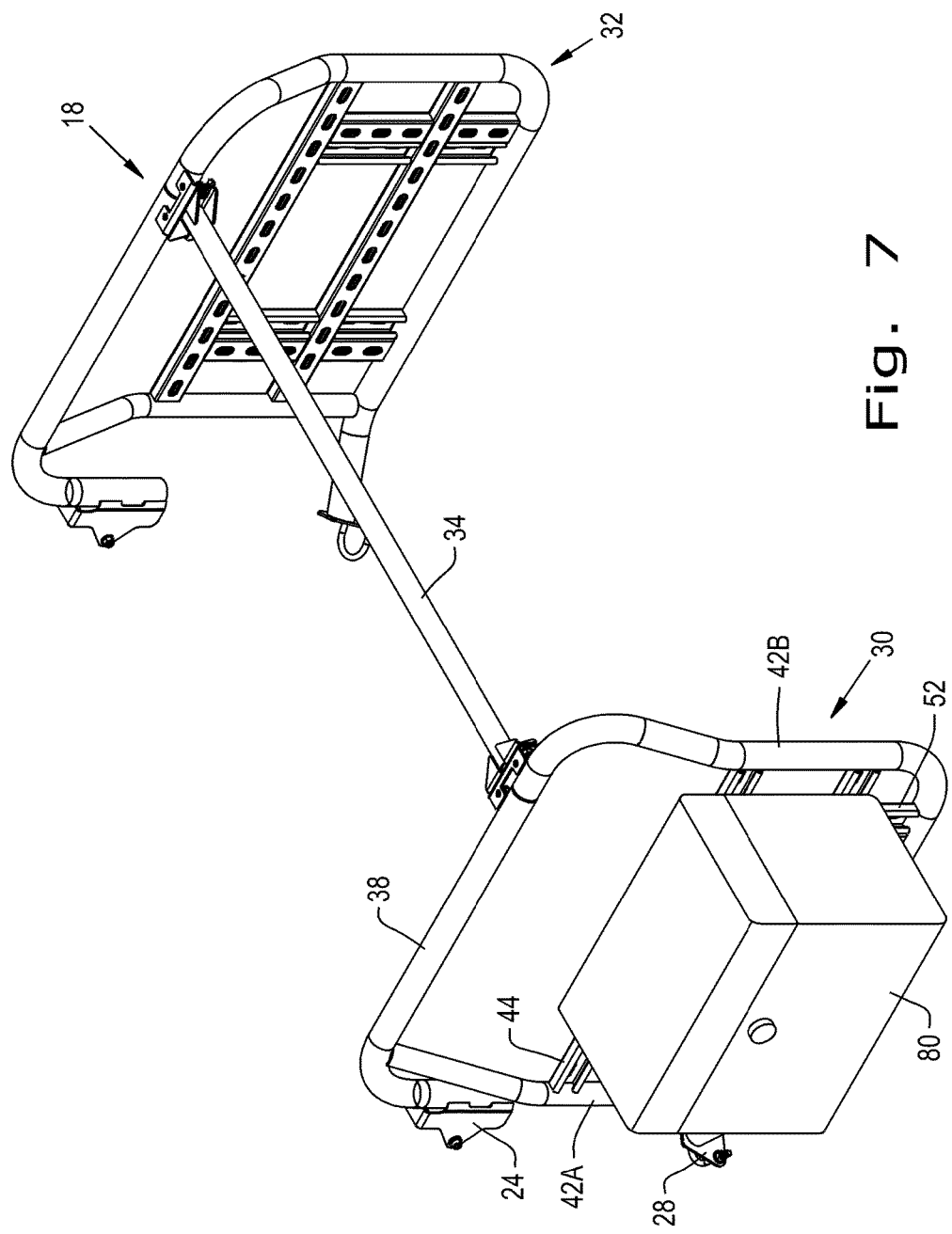
FIG. 7 is a perspective view of the rack shown in FIG. 5 with a storage box mounted to the rack.

As can be seen in FIG. 1, the first rack side member 30 can include a side member frame 36 with a frame top 38 defining a top of the rack 18, a frame bottom 40 defining a bottom of the first rack side member 30 and rack 18, and frame bars 42A and 42B connecting the frame top 38 to the frame bottom 40. As shown in FIGS. 1-2, the top 38 and bottom 40 of the rack 18 are above the dump bed 12 when the dump bed 12 is in the non-dumping position. The side member frame 36 can further include one or more frame beams 44 extending between the frame bars 42A and 42B. While two frame beams 44 are shown, it is contemplated that more frame beams 44 can be incorporated in one or both of the rack side members 30 and 32. The frame beams 44 can have a track 46 formed therein that can hold a mounting unit 48 (shown in FIG. 8) to allow various items to be connected to the first rack side member 30, as shown in FIG. 7. The frame beams 44 can also have beam slots 50 formed therein that will allow items to be bolted to the frame beams 44. One or more slotted mounts 52 can be perpendicularly connected to the frame beams 44 so that the frame beams 44 extend in the horizontal direction between frame bars 42A and 42B and the slotted mounts 52 extend in the vertical direction between frame beams 44. The slotted mounts 52 can include shelf slots 54 that accept corresponding shelf protrusions 56 on a lateral side 58 of the shelf 20 to form an interference fit between the shelf slots 54 and the shelf protrusions 56, connecting the shelf 20 to the first rack side member 30. It should be appreciated that the second rack side member 32 can have a similar side member frame 60 (shown in FIG. 2) that will connect to an opposite lateral side 62 (shown in FIG. 2) of the shelf 20 to secure the shelf 20 to the rack 18.

Referring now specifically to FIG. 2, it can be seen that the first rack side member 30 and second rack side member 32 can be mounted to the vertical supports 22 and shaped such that each rack side member 30 and 32 extends out of a plane defined by the respectively connected vertical support 22. As can be seen in FIG. 2, this allows the rack 18 to have a maximum rack width W1 at the frame bottom 40 of the rack side members 30 and 32 and a minimum rack width W2 where the crossbar 34 connects the first rack side member 30 to the second rack side member 32 adjacent to the roof 16. The maximum rack width W1 of the rack 18 can define the maximum width of the UTV 10 and be greater than a dump bed width W3 of the dump bed 12.

Figure 3:
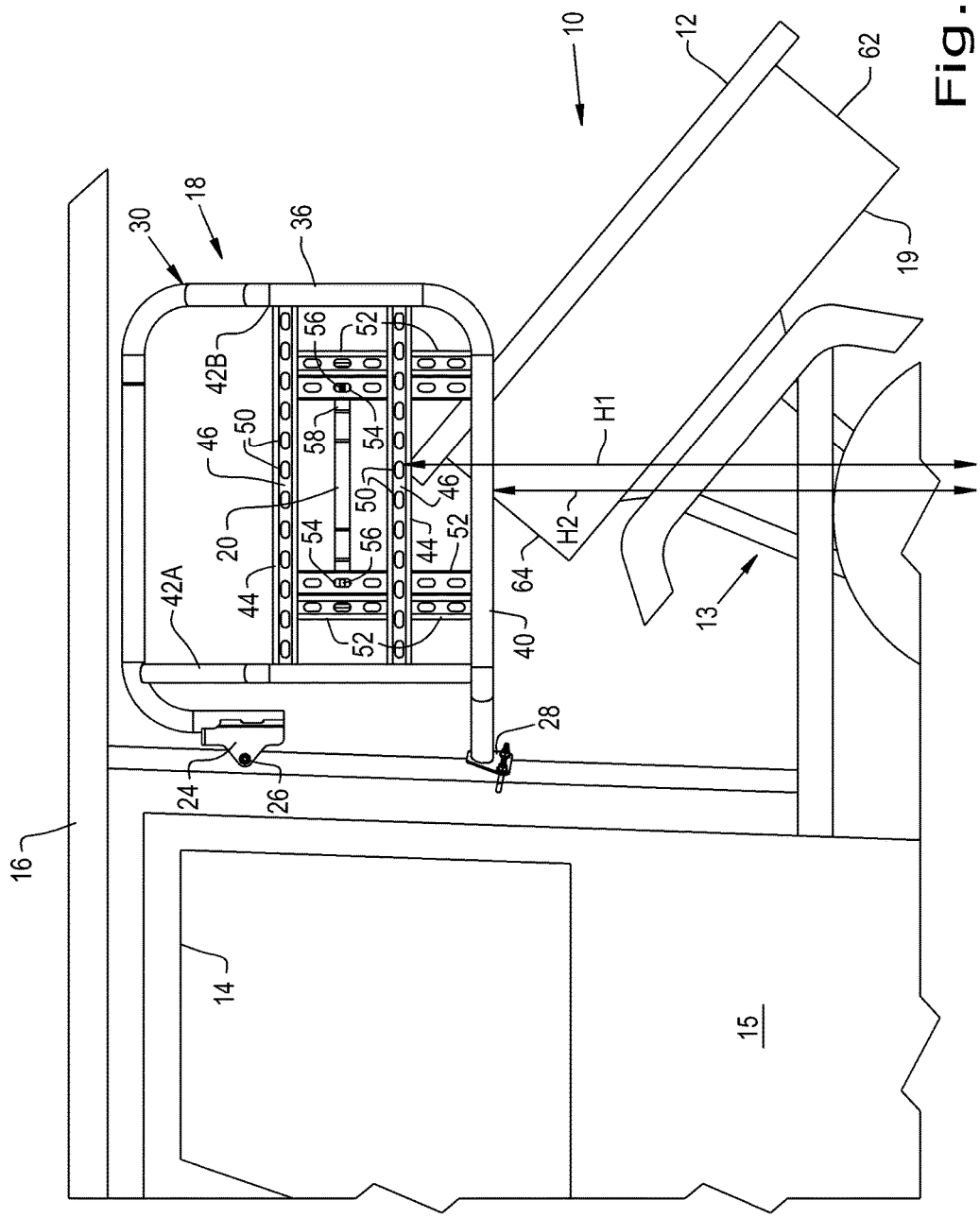
FIG. 3 is a side view of the utility vehicle shown in FIGS. 1-2 with a dumping mechanism employed to move the dump bed to a dumping position.
Figure 4:
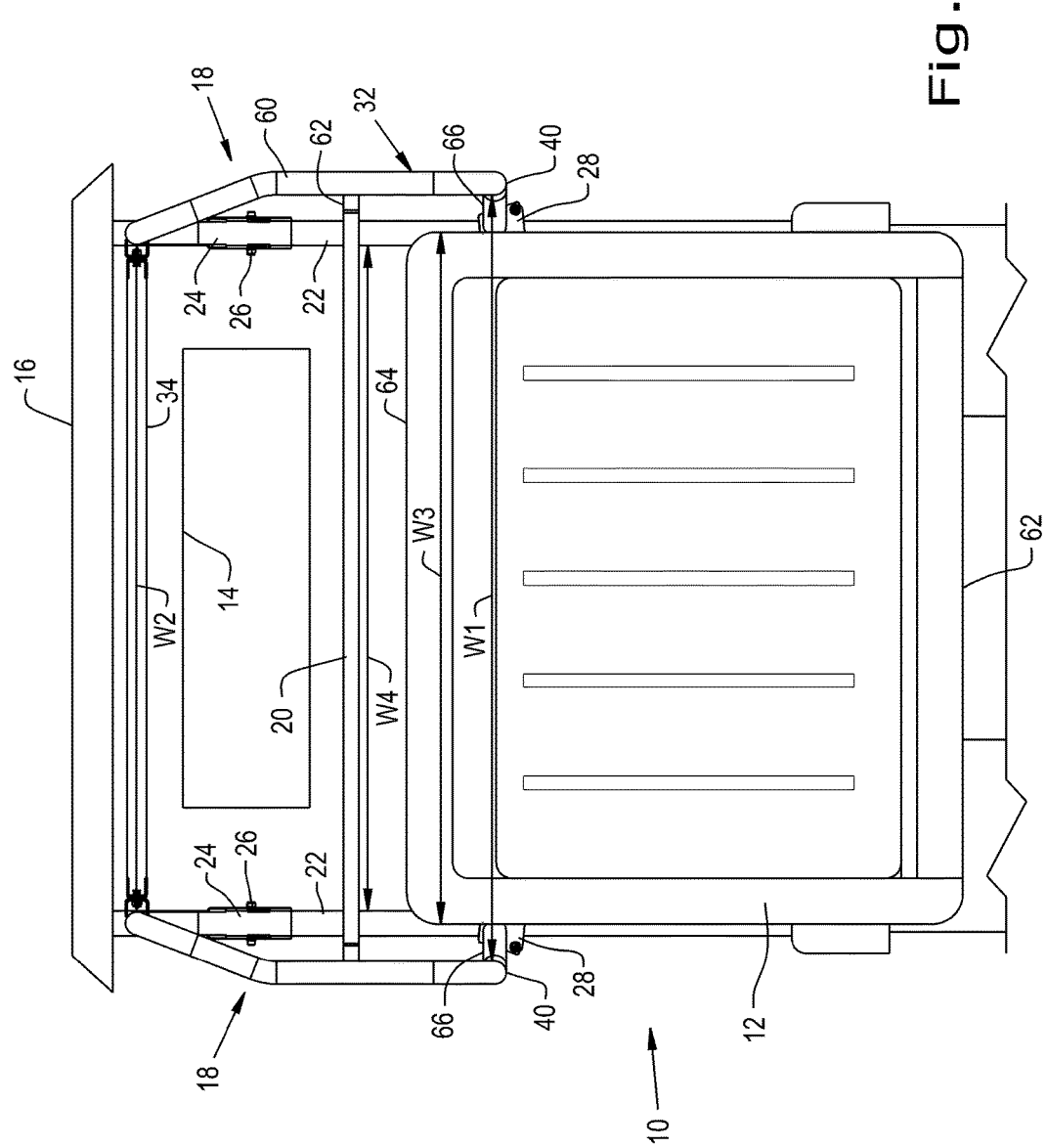
FIG. 4 is a rear view of the utility vehicle shown in FIGS. 1-3 with the dump bed in the dumping position shown in FIG. 3.

Referring now to FIGS. 3-4, the dump bed 12 is shown in a dumping position caused by the dumping mechanism 13 tilting the dump bed 12 away from the cab 14 to dump out material held in the dump bed 12. To tilt the dump bed 12, a back side 62 of the dump bed 12 is lowered, compared to the non-dumping position, and a front side 64 of the dump bed 12 is raised. After the dump bed 12 is maximally tilted by the dumping mechanism 13, which can be referred to as the maximum dumping position of the dump bed 12, the front side 64 of dump bed 12 defines a maximum height H1 relative to the surface that the UTV 10 is traversing. As can be seen, the frame bottom 40 can define a rack bottom height H2 of the rack 18 that is at or below the maximum height H1 of the dump bed 12. It can also be seen that the optional shelf 20 is held by the rack side members 30 and 32 above the maximum height H1 of the dump bed 12 in the dumping position to avoid the shelf 20 being contacted by the dump bed 12 while the dump bed is in the dumping position. Since the rack 18 defines a maximum rack width W1 at the bottom 40 of the rack 18 that is greater than the dump bed width W3, the rack 18 does not interfere with the tilting of the dump bed 12 to the maximum height H1 even though the rack bottom height H2 is below the maximum height H1. However, the vertical supports 22 may define a support width W4 therebetween which is equal to or less than the dump bed width W3. To allow the rack 18 to be supported at the bottom 40 by connecting the bottom 40 to the vertical supports 22 via secondary mounting brackets 28, the bottom 40 of the rack side members 30 and 32 can each have an angled portion 66 connecting the bottom 40 to the vertical supports 22. As shown in FIG. 4, the angled portions 66 can define a tapering width W5 (shown in FIG. 2) therebetween that decreases in a direction from the front side 64 of the dump bed 12 toward the cab 14. The tapering width W5 can be greater than the dump bed width W3 in a tilting travel path of the dump bed 12 and decrease to the support width W4 as the angled portions 66 approach the secondary mounting brackets 28, allowing the bottom 40 of the rack 18 to not interfere with the dump bed 12 in the dumping position while still being connected to the vertical supports 22. By having the rack bottom height H2 being less than the maximum height H1 of the dump bed 12 in the dumping position, the rack 18 can be extended in the vertical direction to provide more surface area to which various items can be attached to the rack 18. Further, the rack 18 can also be more accessible to users since the bottom 40 of the rack 18 is lower to the ground compared to a rack that has a rack bottom height above the maximum height H1 of the dump bed 12.

Figure 5:
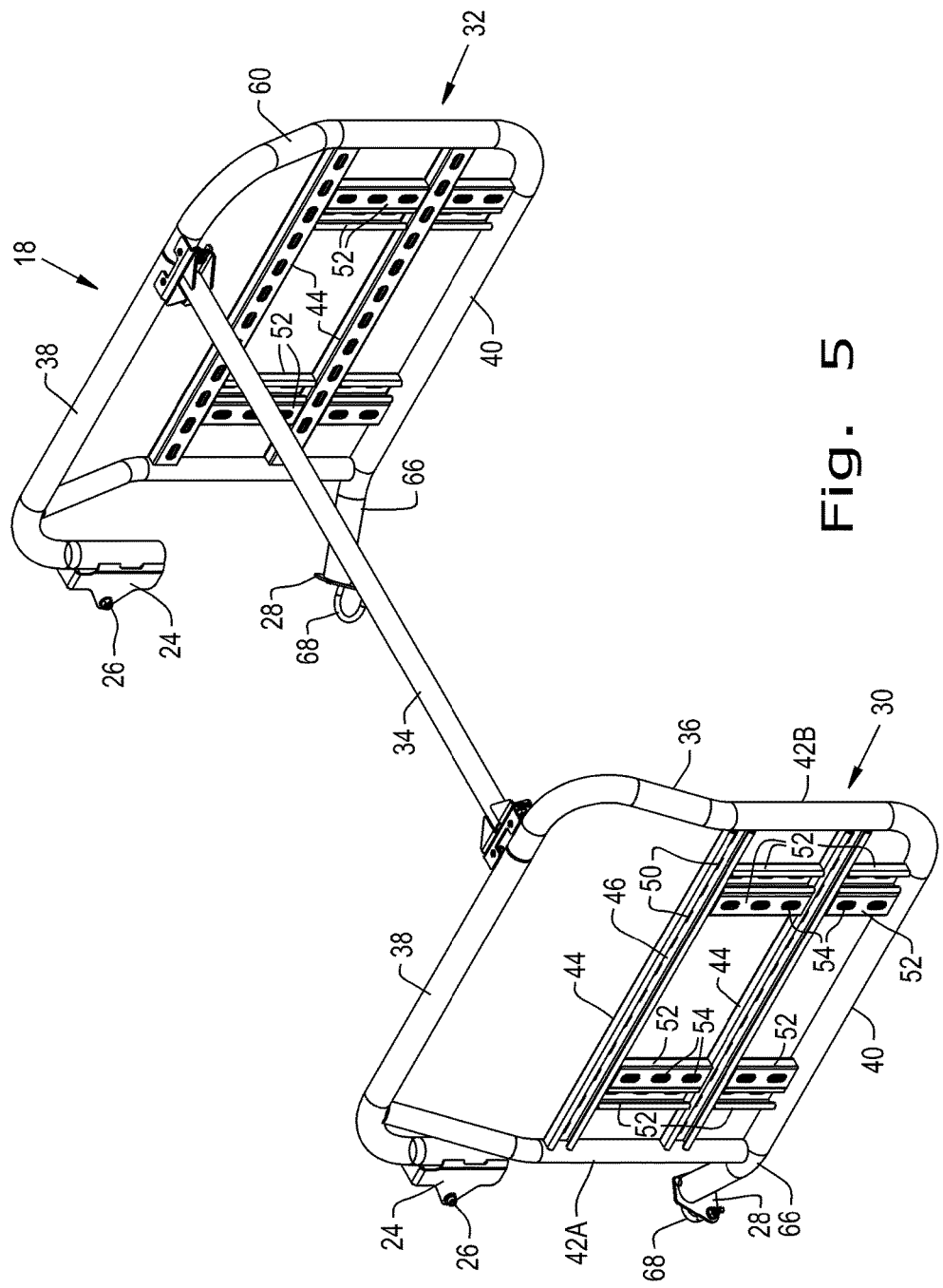
FIG. 5 is a perspective view of an embodiment of a rack that can be attached to the utility vehicle shown in FIGS. 1-4.

Referring now to FIG. 5, the rack 18 is shown disconnected from the vertical supports 22. As can be seen, the secondary mounting brackets 28 can include a hook 68 to connect the bottom 40 of the rack 18 to the vertical supports 22.

Figure 6:
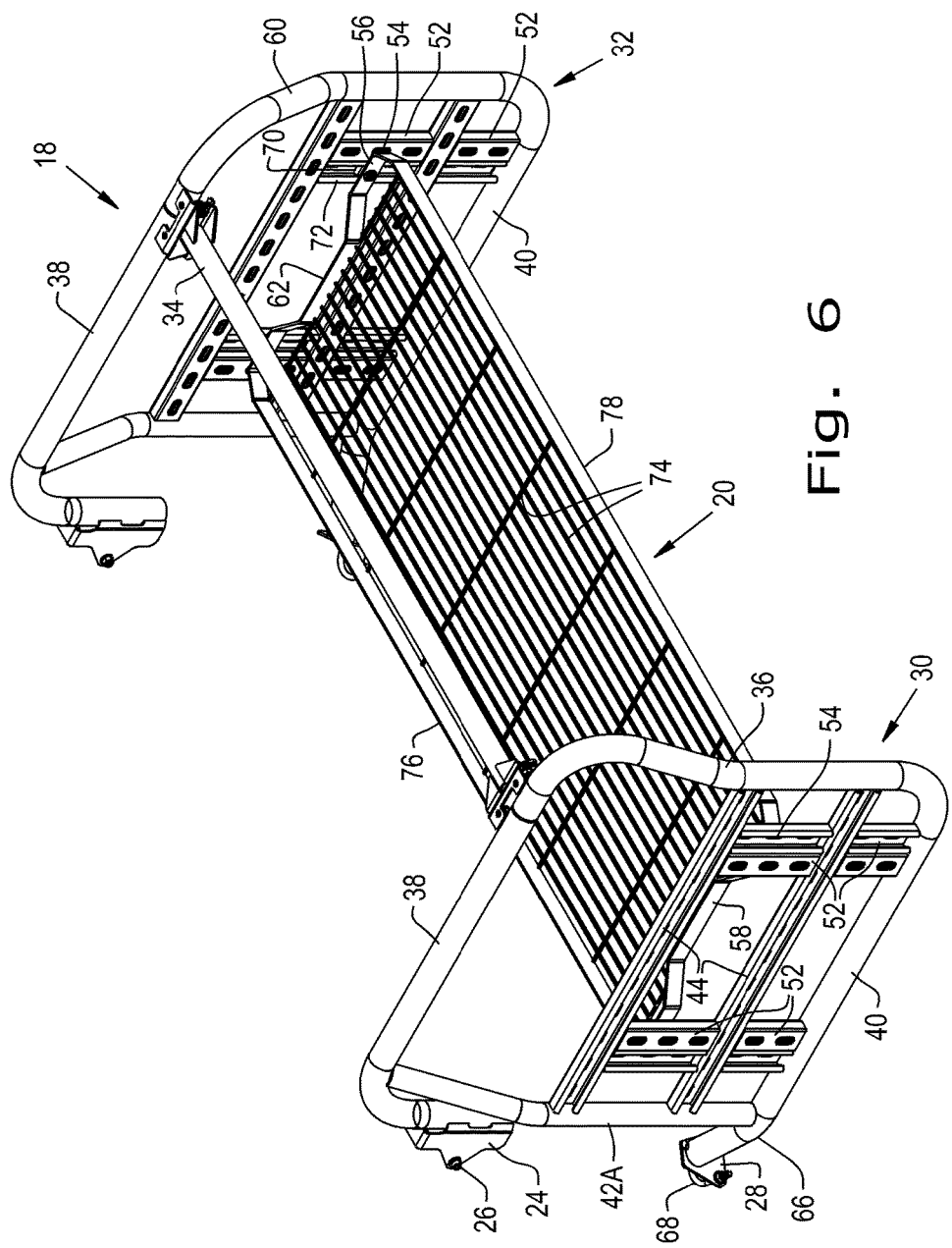
FIG. 6 is a perspective view of the rack shown in FIG. 5 with a shelf mounted to the rack.

Referring now to FIG. 6, the rack 18 is shown with the shelf 20 connected thereto. In addition to the shelf protrusions 56 being held in shelf slots 54, the shelf 20 can also have track members 70 that are held within mounting tracks 72 formed in the slotted mounts 52. The shelf 20 can be a wireframe shelf, as shown, with wires 74 extending between a front 76 and back 78 of the shelf 20 as well as the lateral sides 58 and 62 of the shelf 20. The shelf 20 can also be solid or otherwise constructed to provide a surface that allows objects to be placed on the shelf 20 and carried along with the UTV 10. The front 76 and back 78 of the shelf 20 can be raised, or otherwise configured, above the wires 74 of the shelf 20 to provide lips that will impede forward and backward movement of objects placed on the shelf 20, with the side rack members 30 and 32 providing similar motion impediment in the lateral directions.

Figure 8:
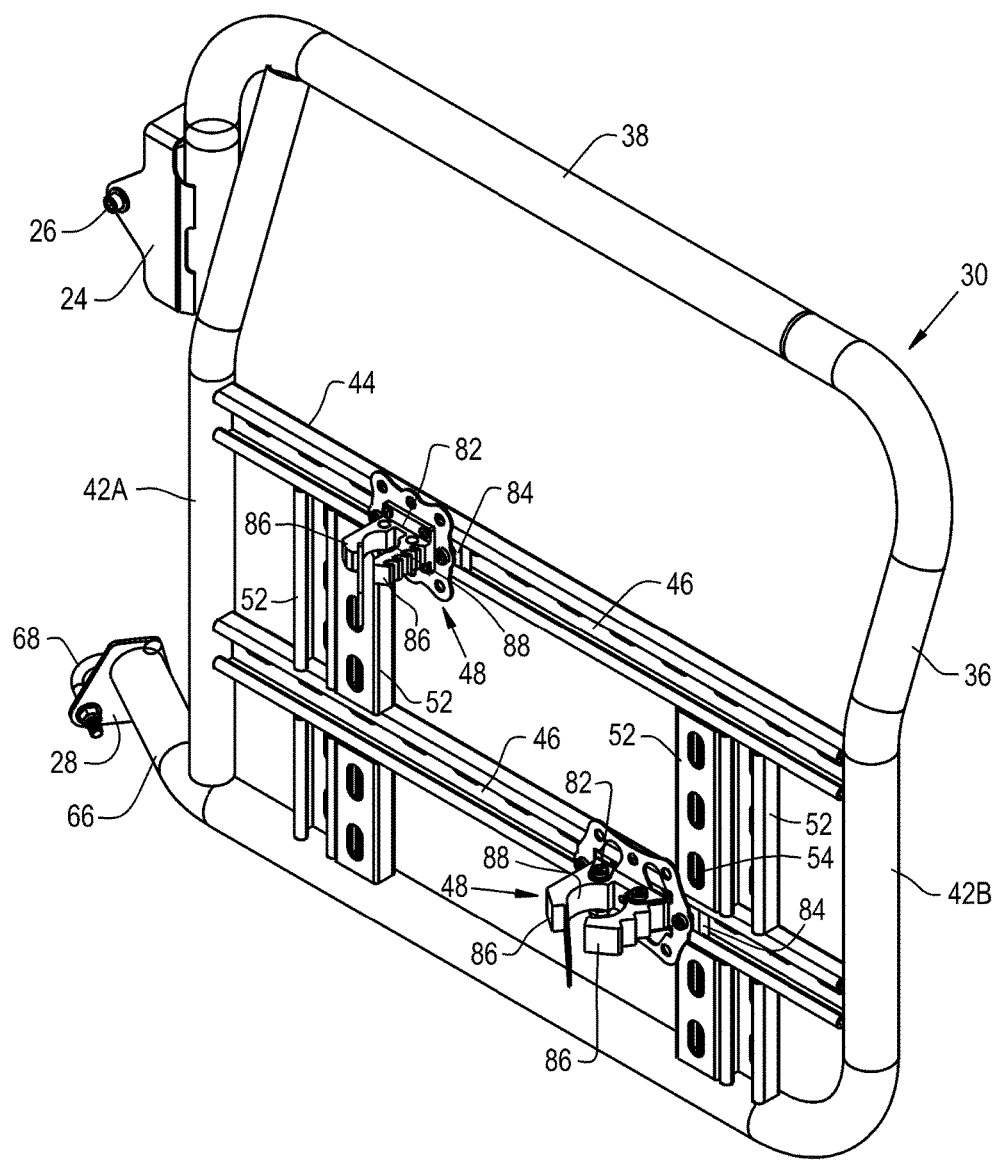
FIG. 8 is a perspective view of a side rack member of the rack shown in FIG. 5 having mounting units attached thereto.

Referring now to FIGS. 7-8, the rack 18 is shown with a container 80, shown as a closable box, attached to the first side rack member 30. The box 80 can be connected to the mounting units 48 held in tracks 46 of the frame beams 44. The mounting units 48 can include, for example, a grasping portion 82 that allows the box 80 to connect to the grasping portion 82 and a track portion 84 that is held within the tracks 46. The grasping portion 82 can include claws 86 that are notched to accept corresponding notches (not shown) of the box 80 and allow bars (not shown) of the box to be placed in a grasping opening 88 formed between the claws 86, with each claw 86 pressing against the bar of the box 80 to hold the box 80 in the grasping portion 82. The mounting units 48 can be placed on different frame beams 44 and the track portions 84 of the mounting units 48 can slide within the tracks 46 of the frame beams 44 to adjust both a vertical and horizontal positioning of the mounting units 48 to grasp a variety of different objects. It should therefore be appreciated that many different types of mounting units 48 can be attached to the side members 30 and 32 of the rack 18 to mount many different objects to the rack 18.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A utility vehicle, comprising:
   a frame;
   a dump bed carried by said frame and having a non-dumping position and a dumping position, said dump bed having a maximum height in said dumping position;
   a dumping mechanism connected to said dump bed, said dumping mechanism being configured to move said dump bed between said non-dumping position and said dumping position; and
   a rack carried by said frame and having a bottom with a rack bottom height which is less than said maximum height of said dump bed, at least a portion of said rack being above said dump bed in said non-dumping position, said rack being configured to not interfere with said dump bed in said dumping position; and
   a shelf mounted to said rack, said shelf being positioned to not interfere with said dump bed in said dumping position.

2. The utility vehicle according to claim 1, wherein said rack comprises a first rack side member and a second rack side member defining a maximum rack width therebetween, said maximum rack width being greater than a dump bed width of said dump bed.

3. The utility vehicle according to claim 2, wherein said first rack side member is connected to said second rack side member by a crossbar.

4. The utility vehicle according to claim 3, wherein said crossbar has a crossbar width which is less than said maximum rack width.

5. The utility vehicle according to claim 1, wherein said rack is connected to said frame.

6. The utility vehicle according to claim 5, wherein said frame comprises at least one vertical support connected to said rack.

7. The utility vehicle according to claim 1, wherein said rack
   includes a first rack side member connected to a second rack side member, said first rack side member being connected to
   a first lateral side of said shelf and said second rack side member being connected to a second lateral side of said shelf.

8. The utility vehicle according to claim 1, wherein said rack includes a first rack side member connected to a second rack side member.

9. The utility vehicle according to claim 8, wherein said first rack side member includes a side member frame having at least two frame bars and at least one beam extending between said at least two frame bars.

10. A utility vehicle, comprising:
    a frame;

a dump bed carried by said frame and having a non-dumping position and a dumping position, said dump bed having a maximum height in said dumping position;

a dumping mechanism connected to said dump bed, said dumping mechanism being configured to move said dump bed between said non-dumping position and said dumping position; and a rack carried by said frame and having a bottom with a rack bottom height which is less than said maximum height of said dump bed, at least a portion of said rack being above said dump bed in said non-dumping position, said rack being configured to not interfere with said dump bed in said dumping position, said rack includes a first rack side member connected to a second rack side member, said first rack side member includes a side member frame having at least two frame bars and at least one beam extending between said at least two frame bars, said first rack side member additionally includes a slotted mount connected to said at least one beam.

11. The utility vehicle according to claim 10, wherein said first rack side member has at least two beams extending between said at least two frame bars and said slotted mount extends between said at least two beams.

* * * * *